Patented June 2, 1942

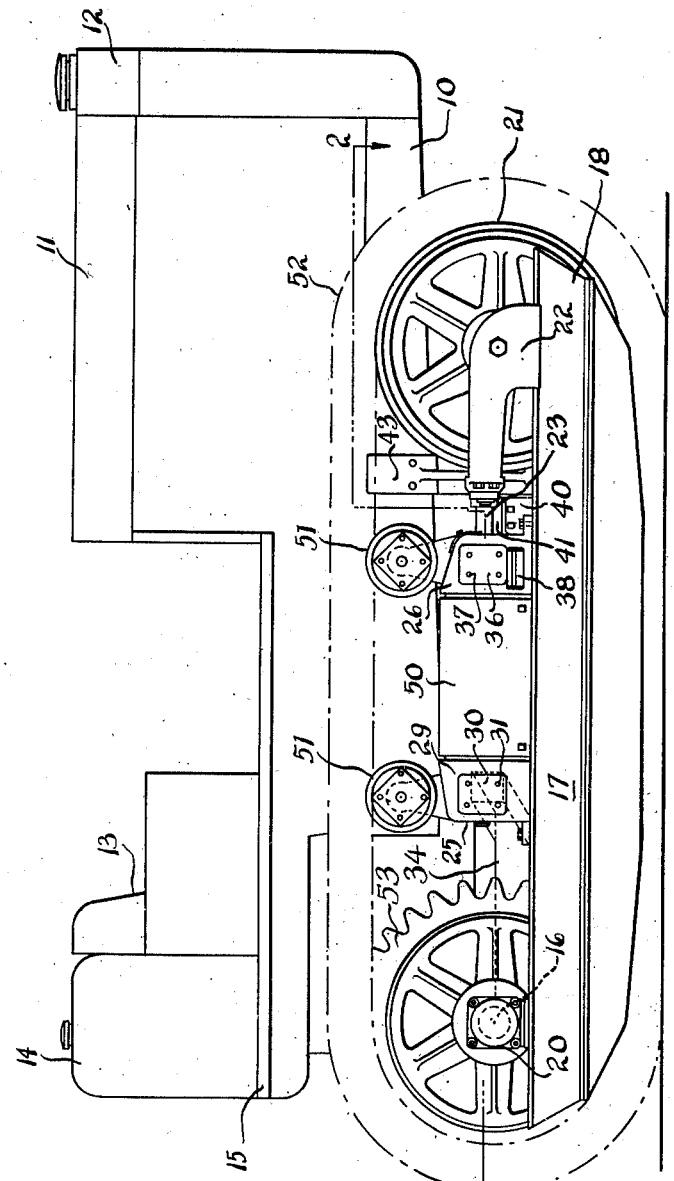

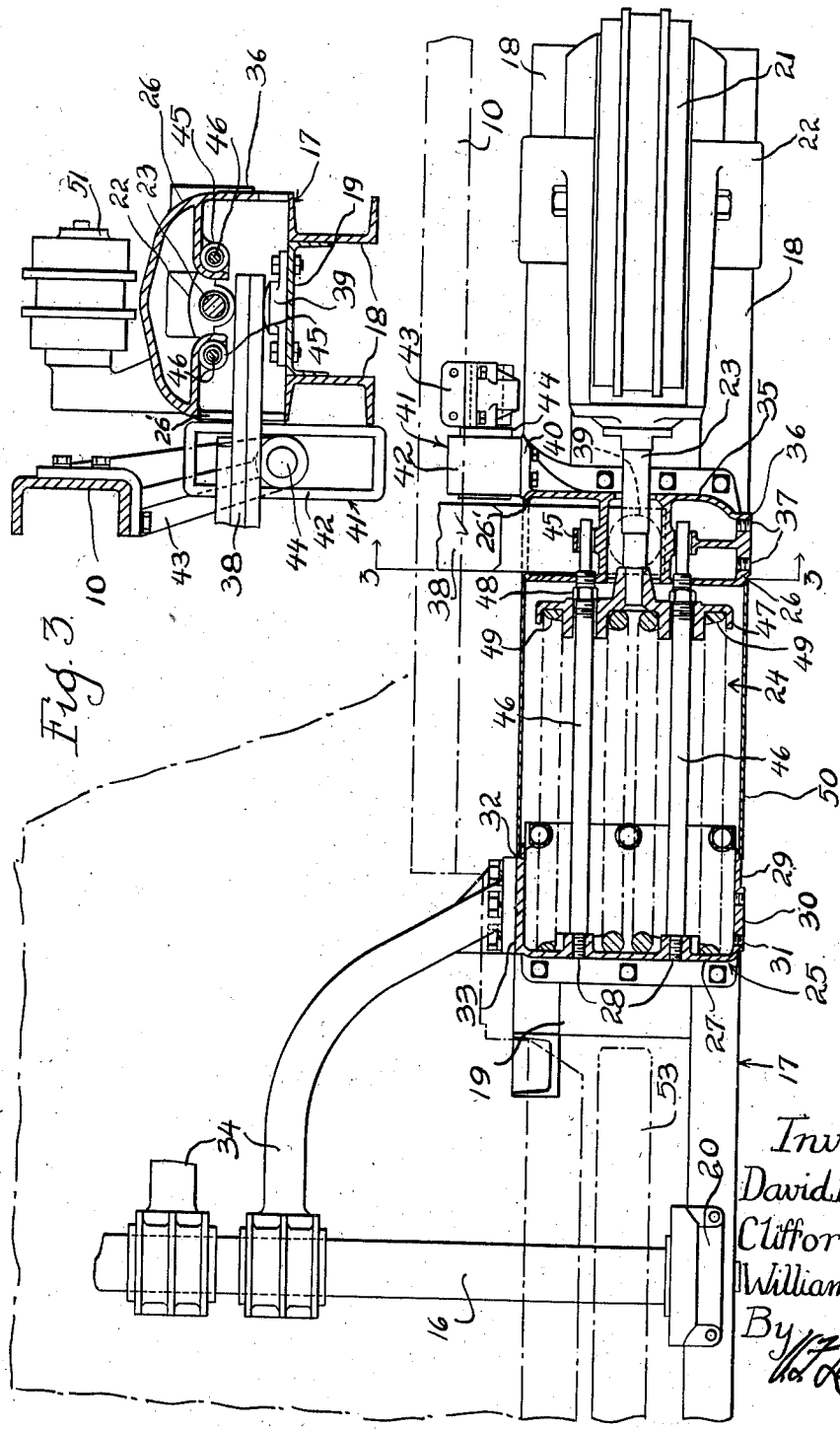

2,284,713

UNITED STATES PATENT OFFICE 2,284,713

TRACTOR

David B. Baker, Riverside, Clifford R. Rogers, Oak Park, and William O. Bechman, Chicago, Ill., assignors to International Harvester Company, a corporation of New Jersey Application March 18, 1938, Serial No. 196,612

16 Claims. (Cl. 305—9)

This invention relates to a tractor of the track laying type.

More particularly the invention relates to an improved track frame structure for the tractor and has for its principal object the provision of a housing or bracket structure which is adapted to be carried by the track frame and which is adapted to support and be connected to various structural parts of the tractor.

An important object is to include in the housing structure a plurality of track rollers for supporting the upper run of the track chain, the portion of the structure between and below the rollers being utilized to support and to house under a removable cover the recoil spring assembly for the front idler wheel of the tractor, movement of the idler wheel in conjunction with the recoil spring assembly being permitted independently of the housing structure.

Another important object of the invention is to provide portions on the housing structure which may be connected to a brace member and to a stabilizing means on the tractor.

Another object of the invention is to provide portions at the outer side of the structure to which various auxiliary structures may be attached.

These and other desirable objects will become more apparent upon examination of the following detailed description taken in conjunction with the accompanying sheets of drawings, in which:

Figure 1 is a side elevational view of a tractor of the track laying type showing generally the location of the improved track frame structure;

Figure 2 is an enlarged horizontal sectional view taken substantially on the line 2—2 of Figure 1 showing in detail the improved structure at one side of the tractor; and, Figure 3 is a transverse sectional view taken on the line 3—3 of Figure 2 showing the structure in conjunction with the tractor equalizer member and the stabilizing means.

It will be noted that only one side of the tractor has been illustrated, and since both sides are the same, only one side will be described in detail.

The tractor illustrated is of a more or less conventional construction and certain parts thereof are shown diagrammatically. The tractor includes a longitudinal main frame 10 which, at its forward end, carries an engine, not shown, enclosed by an engine hood 11 rearwardly of a radiator 12. Rearwardly of the engine hood 11, there is an operator's deck or compartment which includes an operator's seat 13. It will be understood that the various control levers, unnecessary to the description of the invention, are located forwardly of the operator's seat 13. A fuel tank 14 is carried behind the seat 13, the compartment in its entirety being delineated at each side by a longitudinally extending fender 15.

At the rear of the main frame 10, the tractor carries a transverse support in the form of a cross-shaft 16 which, at each opposite end, pivotally carries a longitudinally extending track frame structure 17, comprising a pair of spaced longitudinally extending track frame channel members 18 which provide an integral construction with a horizontal channel member 19. As noted especially in Figure 2, the outer channel member 18 extends some distance rearwardly and is provided with a suitable supporting bracket structure 20 for pivotally mounting the same on the cross-shaft 16. The horizontal channel member 19 terminates some distance rearwardly of the forward end of the track frame structure, and the two side members 18 extend forwardly therebeyond to form a bifurcated portion between which is disposed a front idler wheel 21. This front idler wheel is rotatably carried in a pair of bracket members 22, which in turn are carried by the upper flange of each side frame member 18 for longitudinal movement with respect thereto. Each bracket member 22 includes a rearward portion which forms a yoke structure by virtue of its connection with a longitudinally extending rod 23. The rod 23 extends centrally of the track frame structure and is operably connected to a recoil spring assembly 24. Since the recoil spring assembly is operable independently of the housing structure to be described presently, it will be understood that any suitable type of recoil spring assembly may be utilized, the type illustrated being similar to that disclosed in assignee's Patent No. 2,054,533, granted February 24, 1936. As is well understood by those skilled in the art, the purpose of the recoil spring assembly is to control the longitudinal movement of the front idler wheel with respect to the track frame structure. In the present disclosure, it will be obvious, then, that the front idler wheel has longitudinal movement independently of any part of the improved housing structure.

The improved structure as provided by the invention is rigidly carried by the track frame structure for supporting and housing portions of the recoil spring assembly. This housing structure comprises a pair of longitudinally spaced end or bracket members 25 and 26 rigidly secured to the track frame at the rear and front, respectively. The rear bracket member is provided with a longitudinal recess closed at its rear by a transverse vertical wall 27 provided with a pair of transversely spaced threaded bores 28. An outer portion or wall 29 of the bracket 25 is provided with a substantially flat attaching surface 30 which is provided with a plurality of threaded bores 31. An inner wall or portion 32 of the bracket 26 is provided with a substantially flat surface 33 which is adapted to be rigidly connected to a structural member of the tractor. This structural member may be in the form of a diagonal brace member 34 secured at one end to the flat surface 33 and at the other end to the cross-shaft 16. Since the outer end of the cross-shaft is pivotally connected to the track frame structure, it is desirable that the rearward end of the diagonal brace member 34 be pivotally connected to the shaft.

The forward bracket structure 26 is provided with a longitudinally extending recessed portion substantially closed at its forward end by a vertical transverse wall 35. An outer wall or portion is provided with a substantially flat surface 36 similar to the surface of the rear bracket 25. This surface is provided with a plurality of threaded bores 37. These two attaching surfaces together or individually may be utilized for the attachment of auxiliary structures, such as bulldozers, trail builders or the like. It will be noted that the attaching surface 30 on the rear member 25 is substantially in direct line with the inner face 33. The torque brace 34 is connected to this face 33, and the disposition of the elements thus provided permits shocks received by the auxiliary structures to be transmitted more directly to the main frame through the cross-shaft 16. A portion of the inner side of the bracket 26 is left open, as at 26', and the proximate end of the tractor equalizer member is passed therethrough and substantially enclosed by a recessed portion of the bracket. The end of the equalizer member, which, in the present instance, is in the form of a transverse leaf spring 38, rests on a circular supporting pad 39 rigidly carried by the horizontal frame member 19 of the track frame structure 17. It will be noted that there is little, if any, longitudinal movement between the equalizer spring and the housing structure and accordingly the opening 50 in the wall 27 is not substantially larger than the cross section of the spring. Since the opening is not overly large the entrance of dirt and the like is minimized. It will also be noted that an opening is provided in the outer wall of the bracket 26 to allow escape of dirt or other material from the recessed portion which houses the end of the equalizer member.

A forwardly extending vertical attaching portion 40 is provided integrally with the bracket 26 and is adapted to be connected to another structural part of the tractor. This structural part, in the present instance, is in the form of a roller stabilizer means 41, which comprises a slotted member 42 rigidly secured to the portion 40 and a downwardly extending bracket 43 rigidly carried by one side of the tractor main frame 10. A roller 44 is provided at the lower end of the bracket and is adapted to slide in the slotted member 42. As noted in connection with the rear bracket structure, the forward attaching surface 36 is normally substantially in alinement with the stabilizing means for the purpose of better absorbing shocks received by auxiliary structures. This type of stabilizing means is particularly set forth in assignee's patent to Edward A. Johnston No. 2,135,619, granted November 8, 1938. It will be understood, of course, that the present stabilizer means is only one of many suitable types that may be utilized. In the event that it becomes necessary to remove the track frame structure from the tractor, that operation may be performed without disturbing the housing structure or the brace and stabilizing means.

It will be noted from an examination of Figures 2 and 3 that the rearwardly extending rod 23 of the front idler wheel bracket structure extends through the forward wall of the bracket 26 and is not connected thereto. The bracket is provided rearwardly of the wall 35 with a pair of transversely spaced apertured supporting portions 45.

The recoil spring assembly 24, above referred to, comprises a pair of spaced parallel rods 46 carried at their rear ends in the threaded bores 28 in the rear wall 27 of the rear bracket 25. These rods are loosely carried at their forward ends in the apertured supporting portions 45 in the front bracket 26 for movement with respect thereto. A cross plate 47 is rigidly carried by the rearwardly extending rod 23 and is provided with a pair of spaced openings through which the rods 46 are loosely passed. A nut 48 on each rod 46 prevents axial displacement of the cross plate 47 in a forward direction. A pair of recoil springs 49 surround the rods 46, respectively, being compressed between the cross plate 47 and the rear wall 27 of the rear bracket. The spring assembly, then, abuts the rear bracket and is operable to control longitudinal movement of the idler wheel independently of either of the brackets 25 and 26. To provide for maintaining the recoil spring assembly substantially free from the entrance of dirt, the structure is provided with a removable cover 50, preferably formed of sheet metal and fitted between the brackets 25 and 26, extending downwardly at each side to the track frame structure 17. Thus, it will be seen that the recoil spring assembly and the proximate end of the equalizer member 38 are substantially enclosed by the housing structure comprising the two brackets 25 and 26 and the cover portion 50.

Each bracket member is provided with an integral upwardly extending portion on which is rotatably carried a track roller 51 which supports the upper run of a roller track chain 52 trained about the roller 51, the front idler wheel 21 and about a drive sprocket wheel 53 associated with the cross-shaft 16. This drive wheel 53 is driven by suitable gearing, not shown. Since the housing structure is rigidly carried by the track frame, no relative longitudinal movement between the rollers is permitted.

With the type of recoil spring assembly illustrated and described, it will be noted that the recoil spring does not impart any pressure on the front idler wheel supporting structure, except at those times when the front idler wheel is forced rearwardly by contacting some obstruction or because of comparatively large particles being lodged in the track chain 52. However, recoil springs are common to tractors of many types and form no part of the present invention, the assembly in the present disclosure being shown and described merely to illustrate the manner in which an assembly may be enclosed by the improved housing structure which carries track rollers for the track chain and to which certain structural parts of the tractor may be connected.

It will be appreciated that various other modifications and alterations may be made in the construction disclosed without departing from the spirit and scope of the invention as defined in the appended claims.

What is claimed is:

1. In a tractor of the track laying type, a housing structure rigidly carried by and above a track frame and comprising front and rear, longitudinally spaced bracket portions, each portion including a recess substantially closed by a transverse wall portion, said wall portions being disposed forwardly and rearwardly respectively in the front and rear bracket portions, the forward wall having an opening therethrough, said structure supporting in the recesses the tractor recoil spring assembly, a connecting member between the assembly and the wheel passing through the aforesaid opening, said structure also including a cover portion fitted between the bracket portions and substantially enclosing the assembly, the front portion of the structure including a recess for receiving the proximate end of the tractor equalizer member, each bracket portion having a portion at its inner side connected to a structural member of the tractor, each bracket further having a portion at its outer side providing a substantially flat attaching portion, and each bracket carrying a track roller.

2. In a tractor of the track laying type having a main frame and a longitudinally extending track frame, said track frame including an inner and an outer portion connected rigidly by a transverse portion, said outer portion extending farther rearwardly than the inner, the combination with the track frame of a bracket carried thereabove forwardly of the rear end of the inner portion, and a brace member secured at one end to the bracket member and extending rearwardly and inwardly toward the main frame and having its other end disposed substantially in transverse alinement with the rear end of the outer portion of the track frame and in transversely spaced relation thereto, said rear ends of the brace and of the outer portion of the track frame being pivotally associated with the main frame.

3. In a tractor of the track laying type having a main frame and a longitudinally extending track frame, said track frame including an inner and an outer portion connected rigidly by a transverse portion, said outer portion extending farther rearwardly than the inner, the combination with the track frame of a bracket carried thereabove forwardly of the rear end of the inner portion, a roller rotatably carried by the bracket thereabove, and a brace member secured at one end to the bracket member and extending rearwardly and inwardly toward the main frame and having its other end disposed substantially in transverse alinement with the rear end of the outer portion of the track frame and in transversely spaced relation thereto, said rear ends of the brace and of the outer portion of the track frame being pivotally associated with the main frame.

4. In a tractor of the track laying type having a main frame and a longitudinally extending track frame, said track frame including an inner and an outer portion connected rigidly by a transverse portion, said outer portion extending farther rearwardly than the inner, the combination with the track frame of a bracket carried thereabove forwardly of the rear end of the inner portion, said bracket having inner and outer attaching faces substantially in transverse alinement, and a brace member secured at one end to the bracket at its inner face and extending rearwardly and inwardly therefrom toward the main frame and having its other end disposed substantially in transverse alinement with the rear end of the outer portion of the track frame and in transversely spaced relation thereto, said rear ends of the brace and of the outer portion of the track roller being pivotally associated with the main frame, the aforesaid outer face of the bracket serving as an attaching face for attaching an auxiliary structure.

5. In a tractor of the track laying type having a main frame and a longitudinally extending track frame, said track frame including an inner and an outer portion connected rigidly by a transverse portion, said outer portion extending farther rearwardly than the inner, the combination with the track frame of a bracket carried thereabove forwardly of the rear end of the inner portion, a roller rotatably carried by the bracket thereabove, said bracket having inner and outer attaching faces substantially in transverse alinement, and a brace member secured at one end to the bracket at its inner face and extending rearwardly and inwardly therefrom toward the main frame and having its other end disposed substantially in transverse alinement with the rear end of the outer portion of the track frame and in transverse spaced relation thereto, said rear ends of the brace and of the outer portion of the track frame being pivotally associated with the main frame, the aforesaid outer face of the bracket serving as an attaching face for attaching an auxiliary structure.

6. In a tractor of the track-laying type including a longitudinal body, a longitudinal track frame disposed at one side of the body and connected to the body for movement with respect thereto, a brace means and a stabilizing means carried by the body in longitudinally spaced relation, a front idler wheel on the track frame, an equalizer member disposed transversely of the body and having a portion resting on the track frame, and a longitudinally extending recoil spring assembly arranged on the track frame and connected to the front idler wheel, the combination with the track frame of a housing structure rigidly carried by the track frame and having a substantially open portion, a cover closing said open portion, said structure enclosing and supporting portions of the recoil spring assembly, said structure further enclosing the portion of the equalizer that rests on the track frame, means connecting the housing structure and the brace means, and means connecting the stabilizing means and the housing structure for stabilizing relative movement between the track frame and the tractor body.

7. In a tractor of the track-laying type including a longitudinal body, a longitudinal track frame disposed at one side of the body and connected to the body for movement with respect thereto, a brace means carried by the body, a front idler wheel on the track frame, an equalizer member disposed transversely of the body and having a portion resting on the track frame, and a longitudinally extending recoil spring assembly arranged on the track frame and connected to the front idler wheel, the combination with the track frame of a housing structure rigidly carried by the track frame and enclosing and supporting portions of the coil spring assembly, said structure further enclosing the portion of the equalizer that rests on the track frame, and means connecting the housing structure and the brace means.

8. In a tractor of the track-laying type including a longitudinal body, a longitudinal track frame disposed at one side of the body and connected to the body for movement with respect thereto, a brace means and a stabilizing means carried by the body in longitudinally spaced relation, a front idler wheel on the track frame, an equalizer member disposed transversely of the body and having a portion resting on the track frame, and a longitudinally extending recoil spring assembly arranged on the track frame and connected to the front idler wheel, the combination with the track frame of a housing structure rigidly carried by the track frame and having a substantially open portion, a removable cover closing said open portion, said structure enclosing and supporting portions of the recoil spring assembly, said structure further enclosing the portion of the equalizer that rests on the track frame, means connecting the housing structure and the brace means, and means connecting the stabilizing means and the housing structure for stabilizing relative movement between the track frame and the tractor body.

9. In a tractor of the track-laying type including a longitudinal body, a longitudinal track frame disposed at one side of the body and connected to the body for movement with respect thereto, a stabilizing means carried by the body, a front idler wheel on the track frame, an equalizer member disposed transversely of the body and having a portion resting on the track frame, and a longitudinally extending recoil spring assembly arranged on the track frame and connected to the front idler wheel, the combination with the track frame of a housing structure rigidly carried by the track frame and having a substantially open portion, a cover closing said open portion, said structure enclosing and supporting portions of the recoil spring assembly, said structure further enclosing the portion of the equalizer that rests on the track frame, and means connecting the stabilizing means and the housing structure for stabilizing relative movement between the track frame and the tractor body.

10. In a tractor of the track-laying type including a longitudinal body, a longitudinal track frame disposed at one side of the body and connected to the body for movement with respect thereto, a brace means and a stabilizing means carried by the body in longitudinally spaced relation, a front idler wheel on the track frame, a longitudinally extending recoil spring assembly arranged on the track frame and connected to the idler wheel, a transverse equalizer connected to the body and having a portion engaged with the track frame, the combination with the track frame of a housing structure rigidly carried by the track frame, said structure comprising a pair of longitudinally spaced bracket members and a cover portion substantially enclosing the space between said brackets, said structure being thereby adapted to support and enclose portions of the recoil spring assembly, means connecting the rear bracket to the brace means on the tractor, means connecting the front bracket to the stabilizing means on the tractor body for stabilizing relative movement between the track frame and the tractor body, a track roller carried by each bracket, the front bracket being further formed with a hollow portion for enclosing the portion of the equalizer that is engaged with the track frame.

11. In a tractor of the track-laying type including a longitudinal body, a longitudinal track frame disposed at one side of the body and connected to the body for movement with respect thereto, a brace means and a stabilizing means carried by the body in longitudinally spaced relation, a front idler wheel on the track frame, a longitudinally extending recoil spring assembly arranged on the track frame and connected to the idler wheel, a transverse equalizer connected to the body and having a portion engaged with the track frame, the combination with the track frame of a housing structure rigidly carried by the track frame, said structure comprising a pair of longitudinally spaced end portions and a cover portion substantially enclosing the space between said end portions, said structure being thereby adapted to support and enclose portions of the recoil spring assembly for a front idler wheel of the tractor, means connecting one end portion to the brace means on the tractor, means connecting the other end portion to the stabilizing means on the tractor body for stabilizing relative movement between the track frame and the tractor body and a track roller carried by one end portion, one end portion being further formed with a hollow portion for enclosing the portions of the equalizer that is engaged with the track frame.

12. In a tractor of the track-laying type including a longitudinal body, a longitudinal track frame disposed at one side of the body and connected to the body for movement with respect thereto, a brace means and a stabilizing means carried by the body in longitudinally spaced relation, a front idler wheel on the track frame, a longitudinally extending recoil spring assembly arranged on the track frame and connected to the idler wheel, a transverse equalizer connected to the body and having a portion engaged with the track frame, the combination with the track frame of a housing structure rigidly carried by the track frame, said structure comprising a pair of longitudinally spaced end portions and a cover portion substantially enclosing the space between said end portions, said structure supporting and enclosing portions of a recoil spring assembly, means connecting one end portion to the brace means, means connecting the other end portion to the stabilizing means on the tractor body for stabilizing relative movement between the track frame and the tractor body, and a track roller carried by one end portion, one end portion being further formed with a hollow portion for enclosing the portion of the equalizer that is engaged with the track frame, one of said end portions being further formed at its outer side with an attaching surface.

13. In a tractor of the track-laying type including a longitudinal body, a longitudinal track frame disposed at one side of the body and connected to the body for movement with respect thereto, a brace means and a stabilizing means carried by the body in longitudinally spaced relation, a front idler wheel on the track frame, a longitudinally extending recoil spring assembly arranged on the track frame and connected to the idler wheel, a transverse equalizer connected to the body and having a portion engaged with the track frame, the combination with the track frame of a housing structure adapted to be rigidly carried by the track frame of the tractor, said structure comprising a pair of longitudinally spaced bracket members and a cover portion substantially enclosing the space between said brackets, said structure being thereby adapted to support and enclose portions of the recoil spring assembly, means connecting the rear bracket to the brace means, means connecting the front bracket to the stabilizing means for stabilizing relative movement between the track frame and the tractor body, the front bracket being further formed with a hollow portion for enclosing the portion of the equalizer that is engaged with the track frame, each of the bracket members being provided at its outer side with an attaching surface.

14. In a tractor of the track-laying type, including a longitudinal body, a longitudinal track frame disposed at one side of the body and connected to the body for movement with respect thereto, a brace means and a stabilizing means carried by the body in longitudinally spaced relation, a front idler wheel on the track frame, a longitudinally extending recoil spring assembly arranged on the track frame and connected to the idler wheel, a transverse equalizer connected to the body and having a portion engaged with the track frame, the combination with the track frame of a housing structure comprising a pair of longitudinally spaced brackets rigidly carried by and above the track frame and supporting therebetween portions of the recoil spring assembly, a cover member fitted between the brackets and substantially enclosing the space between the brackets, one bracket being formed at its inner side with a portion connected to the brace means and the stabilizing means in the tractor body for stabilizing relative movement between the track frame and the tractor body, the front bracket being further formed with a hollow portion for receiving the portion of the equalizer that is engaged with the track frame, each bracket further including an upwardly extending portion supporting a track roller.

15. In a tractor of the track-laying type including a longitudinal body, a longitudinal track frame disposed at one side of the body and connected to the body for movement with respect thereto, a plurality of structural members carried by the body in longitudinally spaced relation, a front idler wheel on the track frame, a longitudinally extending recoil spring assembly arranged on the track frame and connected to the front idler wheel, the combination with the track frame of a housing structure rigidly carried by the track frame and enclosing and supporting portions of the recoil spring assembly, a track roller on the housing, and means connecting the housing structure and the aforesaid structural members independently of the track frame.

16. In a tractor of the track-laying type including a longitudinal body, a longitudinal track frame disposed at one side of the body and connected to the body for movement with respect thereto, a transverse equalizer carried by the body and having an end portion carried by the track frame, a front idler wheel on the track frame, and a longitudinally extending recoil spring assembly arranged on the track frame and connected to the front idler wheel, the combination with the track frame of a housing structure associated with the track frame and having a forward part thereof rigid on the track frame, said structure supporting and enclosing portions of the recoil spring assembly, said forward part of the structure being substantially hollow and enclosing the end portion of the equalizer that is carried on the track frame, said part having a side opening through which said end portion extends.

DAVID B. BAKER.
CLIFFORD R. ROGERS.
WILLIAM O. BECHMAN.